(12) United States Patent
Bakholdin et al.

(10) Patent No.: US 11,085,420 B2
(45) Date of Patent: Aug. 10, 2021

(54) GREASE CHANNEL FOR REDUCING GAS PERMEATION INTO VACUUM CHAMBERS

(71) Applicant: Amber Kinetics, Inc., Union City, CA (US)

(72) Inventors: Daniel Bakholdin, Newbury Park, CA (US); Peter Thomas Tennessen, Union City, CA (US); Matthew Brandon Garten, Union City, CA (US); Mark J. Holloway, Union City, CA (US)

(73) Assignee: Amber Kinetics, Inc., Union City, CA (US)

( * ) Notice: Subject to any disclaimer, the term of this patent is extended or adjusted under 35 U.S.C. 154(b) by 468 days.

(21) Appl. No.: 16/017,115

(22) Filed: Jun. 25, 2018

(65) Prior Publication Data

US 2019/0010927 A1    Jan. 10, 2019

Related U.S. Application Data

(60) Provisional application No. 62/529,407, filed on Jul. 6, 2017.

(51) Int. Cl.
| | | |
|---|---|---|
| *F03D 9/12* | (2016.01) | |
| *F03D 9/17* | (2016.01) | |
| *H02J 3/38* | (2006.01) | |
| *F03D 80/70* | (2016.01) | |
| *F03G 3/08* | (2006.01) | |

(Continued)

(52) U.S. Cl.
CPC ............ *F03D 9/12* (2016.05); *F03D 9/17* (2016.05); *F03D 80/70* (2016.05); *F03G 3/08* (2013.01); *H02J 3/30* (2013.01); *H02J 3/386* (2013.01); *F05B 2270/337* (2013.01); *H02J 9/068* (2020.01)

(58) Field of Classification Search
CPC ... F03D 9/12; F03D 9/17; F03D 80/70; F03G 3/08; H02J 3/30; H02J 3/386; H02J 9/068; F05B 2270/337; Y02E 60/16; Y02E 10/76; Y02E 10/72
See application file for complete search history.

(56) References Cited

U.S. PATENT DOCUMENTS

| | | | |
|---|---|---|---|
| 3,143,240 A | 8/1964 | Crocker | |
| 3,588,131 A * | 6/1971 | Nicholson | F16L 17/073 |
| | | | 277/611 |

(Continued)

FOREIGN PATENT DOCUMENTS

| | | | | |
|---|---|---|---|---|
| GB | 413364 A * | 7/1934 | ............... | F16J 15/02 |
| GB | 413364 A | 7/1934 | | |

OTHER PUBLICATIONS

PCT International Search Report and Written Opinion, PCT Application No. PCT/US18/40925, dated Oct. 1, 2018, 13 pages.

*Primary Examiner* — Kenneth Bomberg
*Assistant Examiner* — Adam W Brown
(74) *Attorney, Agent, or Firm* — Soquel Group LLC (57) ABSTRACT

A flywheel device includes an enclosure, a top plate that fastens to the enclosure, where the top plate includes a first opening, and a cap, where the cap has a top side and a bottom side, which when fastened to the first opening forms a seal between the bottom side and the first opening, the bottom side including an o-ring groove configured to hold an o-ring, a grease channel concentric with the o-ring groove, and an inlet port configured to enable grease to flow into the grease channel.

11 Claims, 5 Drawing Sheets

(51) Int. Cl.
*H02J 3/30* (2006.01)
*H02J 9/06* (2006.01)

(56) References Cited

U.S. PATENT DOCUMENTS

| | | |
|---|---|---|
| 3,696,689 A | 10/1972 | Senter et al. |
| 5,752,885 A * | 5/1998 | Kobayashi ............ F16F 15/123 |
| | | 192/205 |
| 6,029,538 A | 2/2000 | Little et al. |
| 9,534,658 B1 | 1/2017 | Rivas et al. |
| 10,018,246 B2 * | 7/2018 | Early ................... F16F 15/3156 |
| 10,707,723 B2 * | 7/2020 | Jones ...................... F16F 15/30 |
| 2009/0195096 A1 * | 8/2009 | Suzuki ................... H02K 7/025 |
| | | 310/74 |
| 2010/0059938 A1 | 3/2010 | Hilton et al. |
| 2016/0265622 A1 * | 9/2016 | Early ................... F16F 15/3156 |
| 2016/0377147 A1 | 12/2016 | Sun et al. |
| 2018/0273016 A1 * | 9/2018 | Xu ........................... B60K 6/10 |

* cited by examiner

GREASE CHANNEL FOR REDUCING GAS PERMEATION INTO VACUUM CHAMBERS

CROSS REFERENCE TO RELATED APPLICATIONS

This application claims the benefit of priority to U.S. Provisional Application No. 62/529,407, filed on Jul. 6, 2017. All of the foregoing are incorporated by reference herein in their entirety for all purposes.

BACKGROUND

1. Field of Art

This description generally relates to energy storage using flywheels. However, the invention may be applied to other applications where minimizing the permeation of gases into a vacuum chamber is desirable.

2. Description of the Related Art

Many energy sources, particularly clean energy sources such as wind turbines and solar panels, generate energy that does not temporally match the load experienced. In much of the developed world, energy generation follows experienced load, such that energy is provided as needed. Under circumstances of high load, techniques such as the use of peaker generators and spinning and non-spinning reserves on thermal generators allow for generation that matches high and variable load. However, despite the availability of such techniques, there are often instances where energy storage is important for meeting energy load.

Existing energy storage systems all have drawbacks of one form or another. Size, price, storage efficiency, efficacy, and safety are all concerns when designing an energy storage system. Generally, smaller size, lower price, reduced loss in both inputting energy for storage and extracting it for distribution, reduced losses for continuous operation, and safe disposal are all preferred characteristics of energy storage systems.

A flywheel is one type of energy storage system that stores energy as rotational kinetic energy. A flywheel rotor is a weighted, rotationally symmetric mass that spins while physically coupled, directly or indirectly, to a motor/alternator that itself is electrically coupled to a converter, such as a back-to-back inverter system, constituting an AC-AC conversion subsystem. When power is received for storage, the rotor is driven, increasing the rotational speed of the flywheel rotor. When power is to be extracted, the flywheel rotor drives the motor/alternator. The faster a flywheel rotor spins, the more energy it stores, but the faster it spins, the higher the rotational losses due to aerodynamic drag. To reduce aerodynamic drag, the flywheel is operated in a chamber which is evacuated, also referred to as a vacuum chamber, to operating pressures that equate to small fractions of an atmosphere. For example, in certain embodiments, the operating pressure range is 0.0001 Torr to 0.100 Torr. (1 ATM=760 Torr).

Elastomeric seals, such as o-rings, are commonly used to seal flanges on vacuum chambers. One drawback to using an elastomeric material is that the permeation rate of gasses is higher for elastomers than for metal seals. Using metallic seals on smaller flanges is very common but becomes more difficult and expensive as the diameter or total length of the seal gets larger. Such seals have the further disadvantage that they are typically single use.

Greases are commonly applied to improve the sealing characteristics of elastomeric seals and help protect them from deterioration due to oxidation and hardening. Typically, grease is applied as a light coating all around the elastomeric seal to provide a thin layer that compensates for microscopic surface finish imperfections. Such a grease layer is typically thin relative to the seal cross-section, and thus does not contribute significantly to slowing permeation.

Manufacturing metallic vacuum chambers using stainless steel helps prevent corrosion of seal surfaces. However, stainless steel is relatively expensive compared to ordinary steel alloy. Thus, it would be desirable have a technique for preventing corrosion across seal surfaces that allows less expensive steel to be used for vacuum chambers.

SUMMARY

The subject invention uses a grease channel in conjunction with an o-ring to improve the seal between two adjacent planar surfaces. The use of a grease channel may reduce the permeation of gasses, especially water vapor, and thus reduces corrosion. The invention is typically used when at least one of the two planar surfaces is metallic and is thus subject to corrosion. However, it may also be used in other contexts.

In certain embodiments, the invention is used to improve a seal between adjacent elements in a flywheel device. It improves the seal by reducing permeation of gasses through the seal. Specifically, in certain embodiments, the invention is used to reduce gas permeation across the seal: (1) between a top plate and a vacuum cap, and/or (2) between the top plate and an enclosure.

Embodiments relate to a flywheel device that includes an enclosure, a top plate that fastens to the enclosure, where the top plate includes a first opening; and a cap, where the cap has a top side and a bottom side, which when fastened to the first opening forms a seal between the bottom side and the first opening, the bottom side includes an o-ring groove configured to hold an o-ring, a grease channel concentric with the o-ring groove; and an inlet port configured to enable grease to flow into the grease channel.

Embodiments further relate to a device that includes a plate or object with a planar surface, and an enclosure comprising a top side that fastens to the plate, where the top side includes an o-ring groove configured to hold an o-ring, and a grease channel concentric with the o-ring groove.

BRIEF DESCRIPTION OF DRAWINGS

Non limiting and non exhaustive embodiments of the present invention are described with reference to the following drawings. In the drawings, like reference numerals refer to like parts throughout the various figures unless otherwise specified.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, or devices. The following detailed description is, therefore, not to be taken in a limiting sense.

As used herein the following terms have the meanings given below:

Vacuum chamber or simply chamber—as used herein, refers to a sealed container enclosure, or vessel that is fully or partially evactuated of gasses. Essentially, the chamber interior is maintained at a lower atmospheric pressure than exists exterior to the chamber.

Grease—an oil-based semi-solid or solid material that is typically used to lubricate parts of mechanical equipment. Grease is often applied to the part being lubricated using a grease gun. As used herein, grease refers to oil-based greases, including vacuum oil, as well as any other corrosion inhibiting substance that can be injected, molded or otherwise inserted into a grease channel.

I. Flywheel Energy Storage System

Figure 1A:
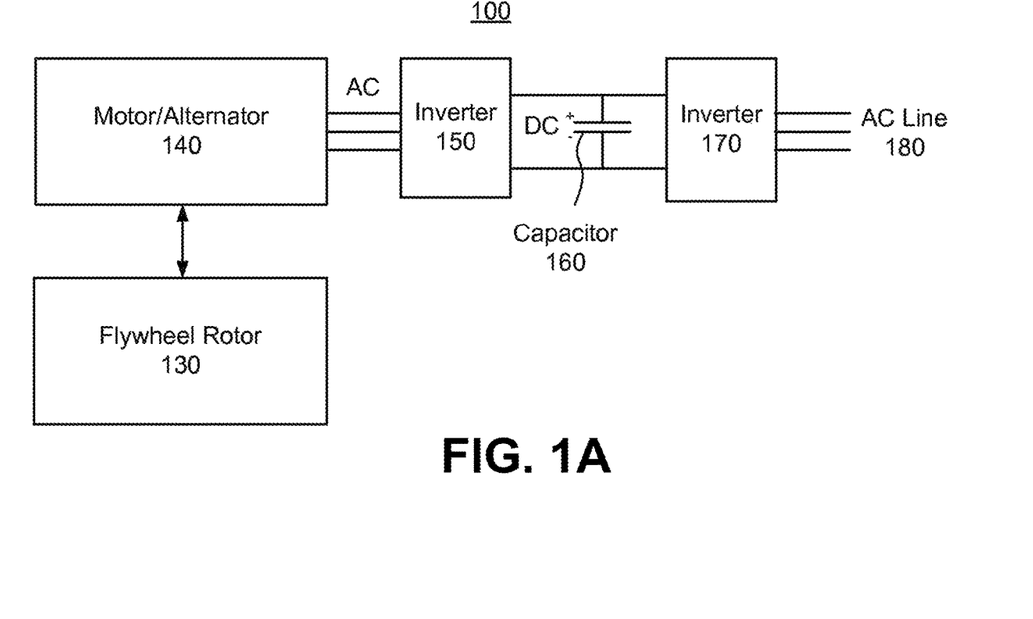
FIG. 1A is a block diagram of an exemplary flywheel energy storage system according to one embodiment.

FIG. 1A is a block diagram of an exemplary flywheel energy storage system 100, that includes a vacuum chamber, according to one embodiment. The energy storage system includes a flywheel rotor 130, a motor/alternator 140, a first inverter 150, a capacitor 160, a second inverter 170, and an AC line 180. Energy is drawn from, or delivered to, an AC line 180, such as a three-phase 60 Hz line. The first 150 and second 170 inverters as well as capacitor 160 illustrate an exemplary back-to-back converter system for converting the input alternating current into an alternating current acceptable to the motor/alternator 140. The motor/alternator 140 converts between electrical and mechanical energy, so that energy can be stored in or drawn from the flywheel rotor 130. The motor/alternator 140 is physically coupled to the flywheel rotor 130 either directly or indirectly using a shaft. The motor/alternator 140 is coupled to the remainder of the system 100 via wires or other electrical couplings. Generally, although only one of each component is shown, in practice a flywheel energy storage system 100 may include multiples of each individual component. FIG. 1 is one exemplary type of ac-to-ac conversion system. In general, the inventions described herein pertain to a broad range of ac-to-ac conversion topologies, as well as systems that interface directly to a direct current (dc) line. The latter are of especial relevance for dc microgrid and solar photovoltaic applications.

Figure 1B:
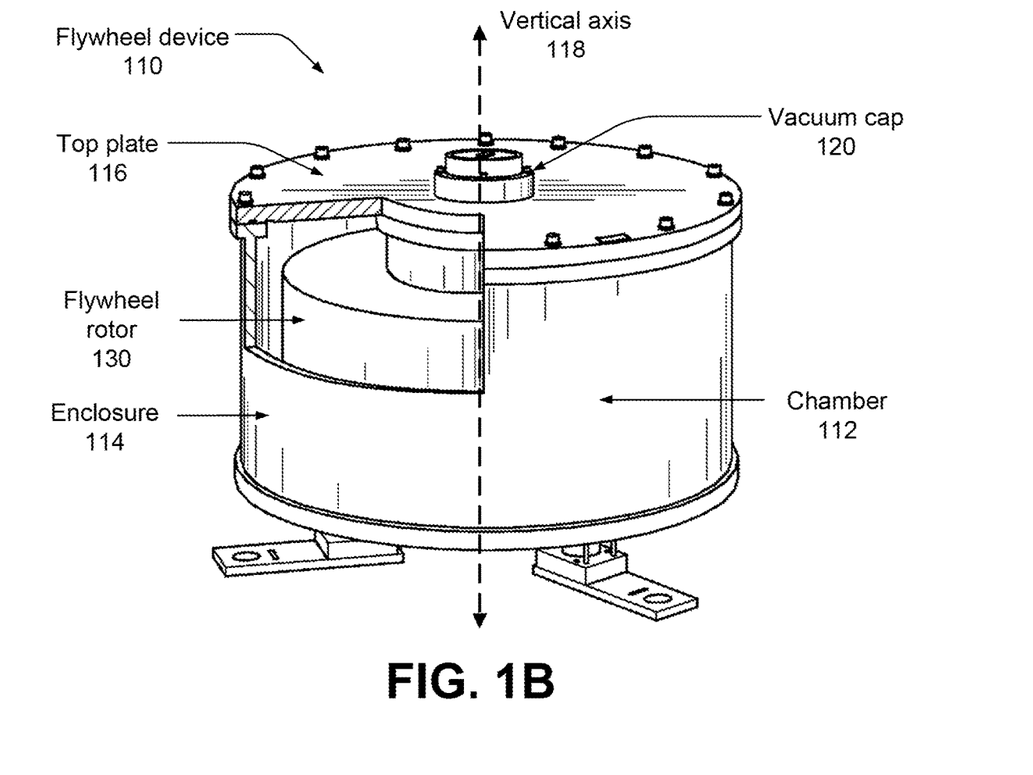
FIG. 1B is a block diagram of an exemplary flywheel device that includes a vacuum chamber, according to one embodiment.

Flywheel energy storage system 100 includes a flywheel device 110, illustrated in FIG. 1B, which has a vacuum chamber 112, also referred to as chamber 112, that is fully or partially evacuated of gas or air. Flywheel device 110 includes flywheel rotor 130 and may include other elements of system 100. Chamber 112 is formed by a flywheel enclosure 114, a top plate 116 and a vacuum cap 120. Top plate 116 fastens to enclosure 114, and vacuum cap 120 fastens to a central portion of top plate 116. Typically the central portion is a cut-out, circular region, which is circular symmetric to a central, vertical axis 118 of flywheel device 110.

In certain embodiments, flywheel device 110 also has a bottom plate and a bottom vacuum cap. Generally, the subject invention may be used to seal the bottom plate and bottom vacuum cap in the same or a similar way that it is used to seal the top plate and the top vacuum cap, as described hereinbelow.

In order to maintain a vacuum or lower atmospheric pressure in the interior of chamber 112 than exterior to it, it is desirable for the seal between adjacent elements of flywheel device 110 to block as much as possible the flow of gasses from the exterior of chamber 112 to its intererior. Thus, in various embodiments, the seal between top plate 116 and enclosure 114 are configured to block gas permeation to the extent possible in view of various limitations, such as material properties, cost, manufacturing efficiency, and the like. Similarly, the seal between vacuum cap 120 and top plate 116 are configured to block gas permeation to the extent possible in view of the limitations. In certain embodiments, vacuum cap 120 has a top opening, illustrated hereinbelow in FIG. 2B; in this case the seal between the top opening of vacuum cap 120 and the top of vacuum cap 120 is also configured to form a seal that blocks gas permeation to the extent possible in view of the limitations.

II. Grease Channel

The subject invention decreases the permeation of gasses, typically ambient air, from the outside to the inside of a vacuum chamber, which may be fully or partially evactuated of gasses. This is accomplished by introducing a grease channel, i.e. a channel, groove, duct or canal, that is filled, or substantially filled, with grease. When a grease channel is used to form a seal, external gasses must permeate the grease channel as well as an o-ring to reach the chamber.

While the ensuing discussion focuses on embodiments that includes a circular o-ring made of an elastomeric material, the invention is not so limited. For example, the invention may be applied in embodiments where there is no o-ring or where the o-ring is made of metal or plastic. Further, the invention may be applied in embodiments where the o-ring is not circular. For example, the o-ring may be square, rectangular or another shape. Further, the invention may be applied in cases where the chamber maintains a lower atmospheric pressure than standard atmospheric pressure, i.e. the chamber is fully evacuated, i.e. a vacuum, or partially evacuated.

Further the invention may be used between any adjacent parts where it is desirable to block the flow of gas. Thus, the invention is broadly applicable for engines, electronic assemblies and machinery, which maintain a chamber that is fully or partially evacuated.

Figure 2A:
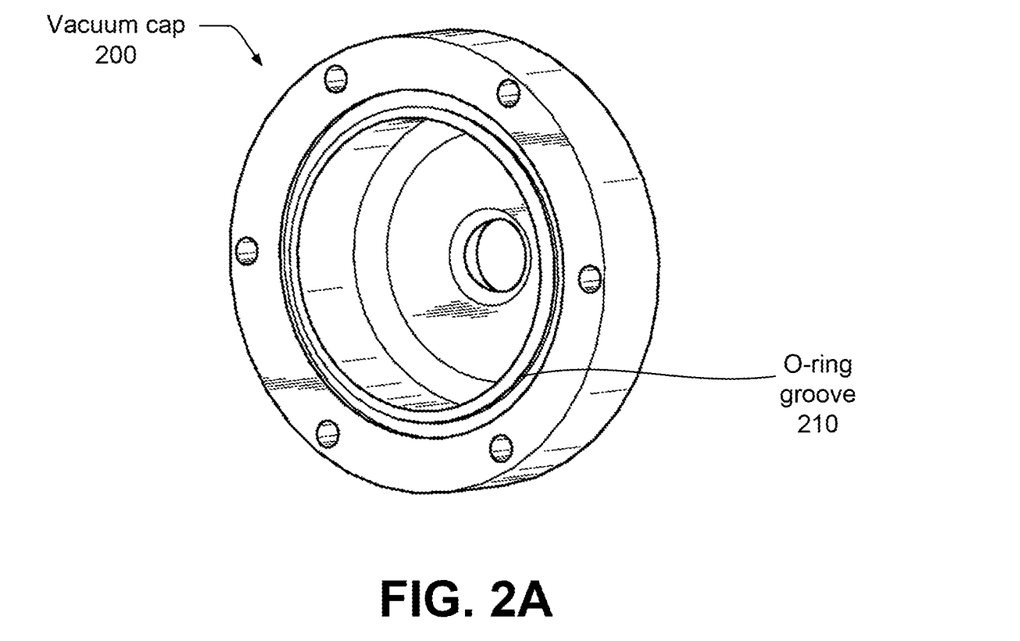
FIG. 2A is a bottom isometric view of a vacuum cap that includes an o-ring groove but which does not include a grease channel, according to one embodiment.
Figure 2B:
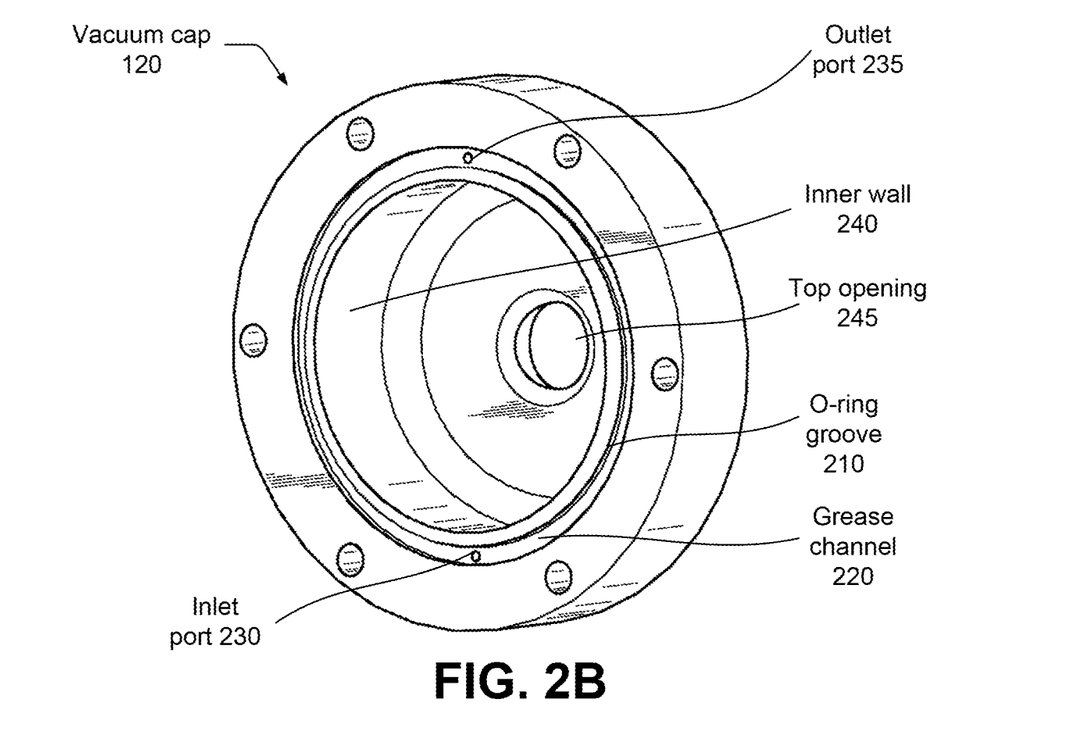
FIG. 2B illustrates a bottom isometric view of vacuum cap, which includes an o-ring groove and a grease channel to o-ring groove, according to one embodiment.

FIG. 2A is a bottom isometric view of a vacuum cap 200 that includes an o-ring groove 210 but which does not include a grease channel, according to one embodiment. FIG. 2B illustrates a bottom isometric view of vacuum cap 120, which includes an o-ring groove 210 and a grease channel 220. In this embodiment, grease channel 220 is exterior to o-ring groove 210. While locating grease channel 220 exterior to o-ring groove 210 has the advantage of preventing rust and corrosion in the o-ring groove, in certain embodiments it may be advantageous to locate grease channel 220 on the interior side of o-ring groove 210. Generally, grease channel 220 is concentric with, in close proximity to, and adjacent to o-ring groove 210, but this is not required.

Grease channel 220 is a channel or groove machined into the bottom circular portion of vacuum cap 120. In certain embodiments, grease channel 220 is substantially less deep than o-ring groove 210. For example, the grease channel 220 may have a depth in a range from 10% to 50% of the depth of the o-ring groove 210, with 20% being a preferred value. In one embodiment, o-ring groove 210 has a depth of 0.206 inches and a width of 0.31 inches. This size accommodates an o-ring that is 0.25 inches high by 0.25 inches wide. An o-ring groove is typically slightly shorter and wider than the o-ring itself so that when vacuum cap 120 is fastened to top plate 116 there is room for the o-ring to flatten somewhat, i.e. compress in the vertical direction and expand in the horizontal direction, due to the compressive force exerted against it. The compression of the o-ring forces the o-ring against the sides of o-ring groove 210, creating a seal. In this embodiment, grease channel 220 is 0.35 inches wide and 0.05 inches deep.

In order to ensure that the entire channel, substantially all of the channel, can be filled with grease, two ports 230, 235 are provided that allow grease to flow from the outside of flywheel device 110 into grease channel 220 and back. In this embodiment, ports 230 and 235 are positioned 180 degrees apart from one another. One port, referred to as inlet port 230, is used as the grease inlet while outlet port 235 is used as an outlet to allow any overflow grease to escape.

During installation, once vacuum cap 120 is fitted onto and fastened to top plate 116 pressurized grease, from a grease gun for instance, is injected into inlet port 230. The grease enters grease channel 220 through inlet port 230 and flows substantially evenly in both directions inside grease channel 220. Typically, grease is injected until flows out of and emerges from outlet port 235, signifying that grease channel 220 is completely full.

Vacuum cap 120 has an inner wall 240. In certain embodiments, vacuum cap 120 also has a top opening 245 that may be used, for example, for service access or sensor circuits.

Figure 3A:
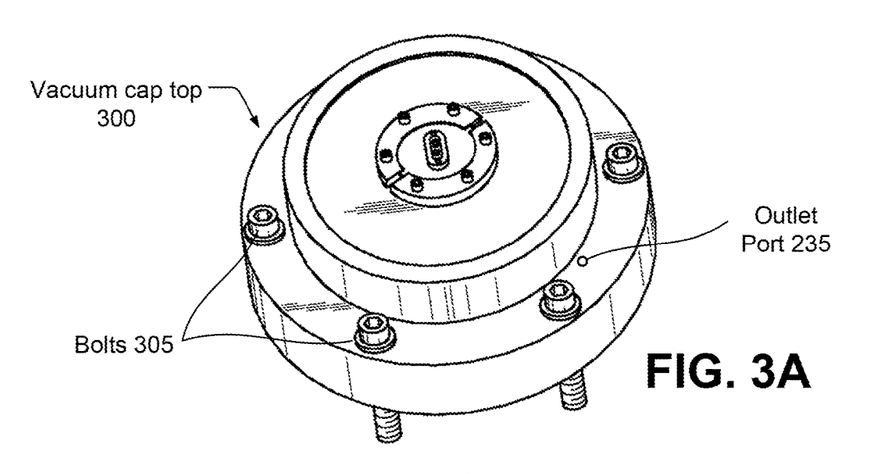
FIG. 3A is a top isometric view of the top of the vacuum cap, according to one embodiment.

FIG. 3A is a top isometric view of the top of vacuum cap 120, referred to as vacuum cap top 300. In the embodiment shown, a ring of bolts 305 is used to fasten vacuum cap 120 to top plate 116. Outlet port 235 is visible in this view.

Figure 3B:
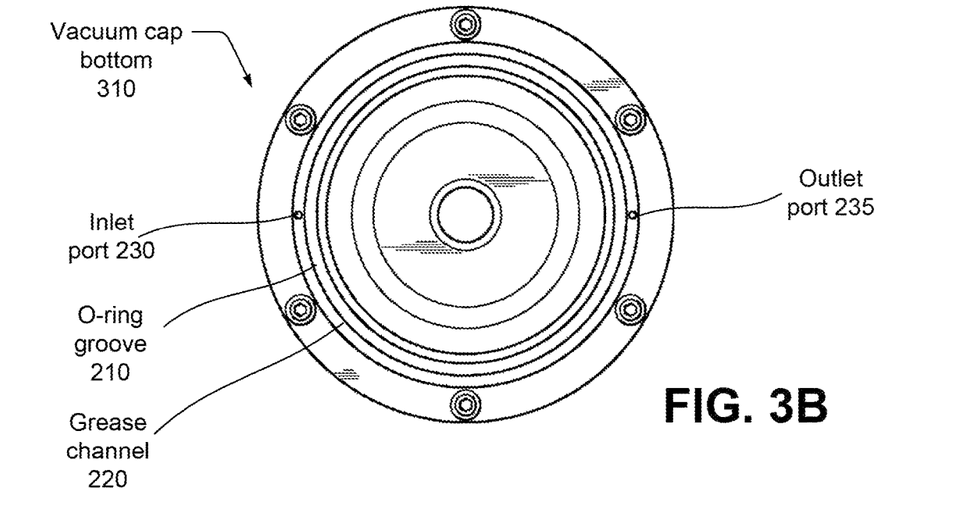
FIG. 3B is a view of the bottom of the vacuum cap, according to one embodiment.

FIG. 3B is a view of the bottom of vacuum cap 120, referred to as vacuum cap bottom 310. In the embodiment shown, vacuum cap bottom 310 includes o-ring groove 210, grease channel 220, inlet port 230 and outlet port 235. Each of ports 230 has one opening or hole in vacuum cap top 300 and one in vacuum cap bottom 310 through which grease may flow.

Figure 3C:
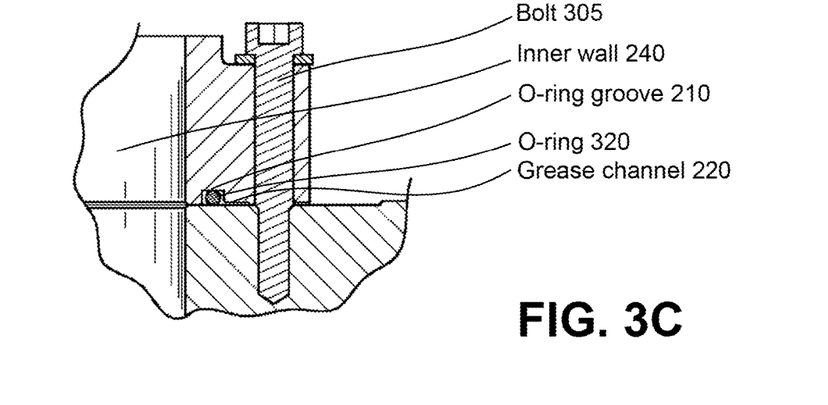
FIG. 3C is a cross-section of the vacuum cap that illustrates an o-ring fitted into the o-ring groove and the grease channel, according to one embodiment.

FIG. 3C is a cross-section of vacuum cap 120 that illustrates an o-ring 320 fitted into o-ring groove 210 and a grease channel 220. To the left of o-ring groove 230 in the embodiment shown is a slight gap, and to the left of that is inner wall 240 of vacuum chamber 112. To the right of o-ring 320 is grease channel 220 that in normal operation would be full of grease to block gas permeation across o-ring 320 and into chamber 112.

Figure 4A:
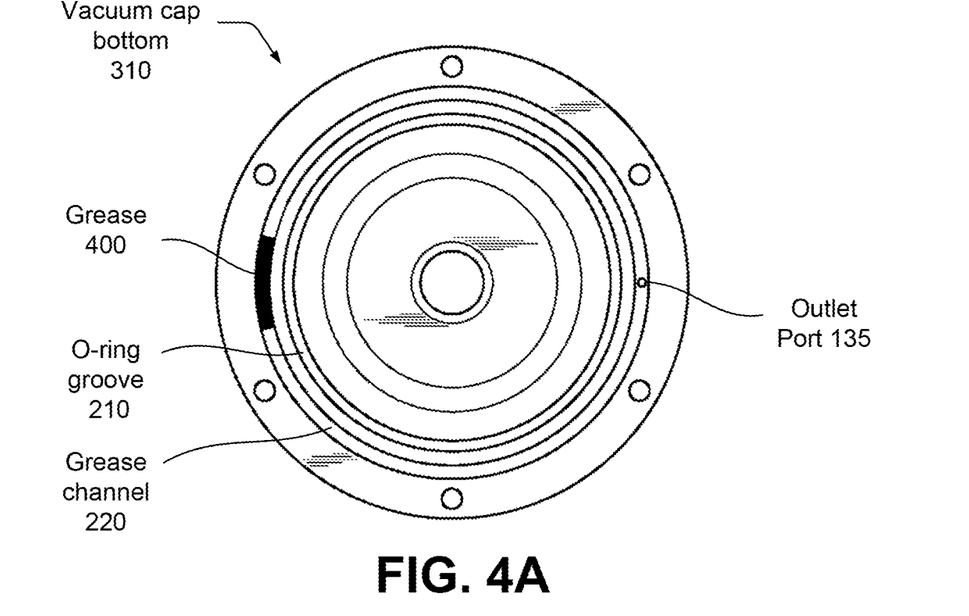
FIG. 4A illustrates the grease channel when a relatively small amount of grease has been injected, according to one embodiment.
Figure 4B:
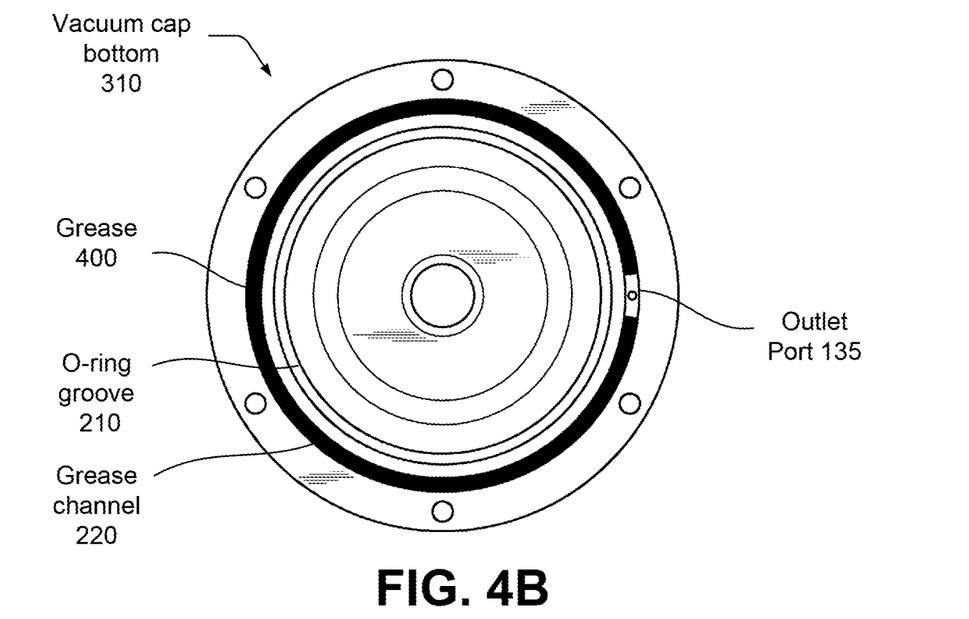
FIG. 4B illustrates the grease channel when it is nearly full of grease, according to one embodiment.

FIGS. 4A-4B are illustrations that depict the progression of grease when grease channel 220 fills. In this example, the bottom of vacuum cap 120 is depicted to show the filling of grease channel 220.

FIG. 4A illustrates grease channel 220 when a relatively small amount of grease has been injected. Since the grease flows into grease channel 220 through inlet port 230 that port is covered with grease and is not visible. The grease flows evenly in both directions from inlet port, given sufficient pressure, 230 upon entering grease channel 220.

Next, FIG. 4B illustrates grease channel 220 when it is nearly full of grease. At this point, only outlet port 235 is visible, i.e. grease covers all other parts of grease channel 220. Typically, grease channel 220 continues to fill until grease begins to extrude from outlet port 235 at which point the injection of grease would halt.

Generally, a grease channel functions as a barrier to corrosion. With this barrier in place, it allows the manufacturer to fabricate a vacuum chamber out of low cost steel. Grease channel 220 greatly limits corrosion on the interior side of the grease channel, including the surface of top plate 116 on the interior side of grease channel 220. Grease channel 220 also reduces the flow of gases including water vapor which can have a damaging effect.

Figure 5:
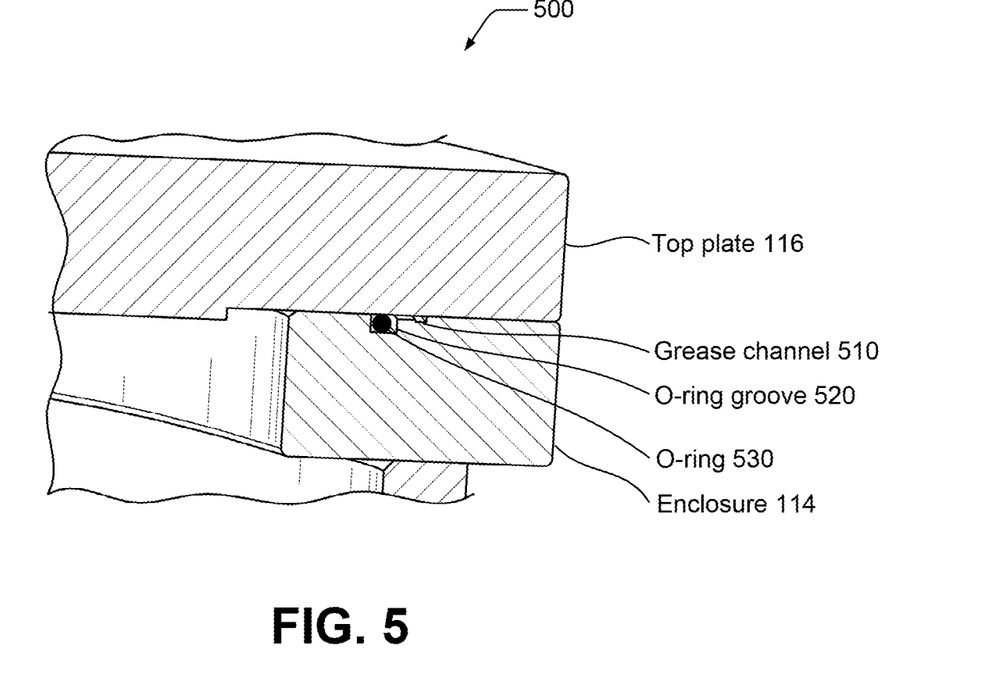
FIG. 5 illustrates a cross section of an embodiment in which the subject invention is used to improve the seal between a top plate and an enclosure.

FIG. 5 illustrates a cross section of an embodiment 500 in which the subject invention is used to improve the seal between top plate 116 and enclosure 114. In embodiment 500, an o-ring groove 520 and a grease channel 510 are machined into the top of enclosure 114 where it contacts the bottom side of top plate 116. An o-ring 530 is disposed inside of o-ring groove 520. It may be appreciated that embodiment 500 may or may not include an inlet port or an outlet port. In this embodiment, it is possible to apply grease to the grease channel 510 before placing and fastening top plate 116. An inlet port and/or an outlet port may be added in certain embodiments.

Embodiment 500 illustrates the flexibility of the subject invention. The grease channel and o-ring groove may be formed in the top or bottom of a horizontal junction between two adjacent planar or flat surfaces. Each of the two planar surfaces may belong to a plate, a bar, a rail, an enclosure, or another object. Generally, it is contemplated that due to the anti-corrosive value of the seal formed by the subject invention one of the two surfaces is metallic and thus subject to corrosion or rust. Further, the subject invention may also be applied when two adjacent surfaces have a vertical or oblique junction or contact.

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A device comprising:
   an enclosure with a vertical axis, having a top and a bottom;
   a plate that fastens to the top of the enclosure, wherein the plate includes an opening; and
   a cap, comprising a top side and a bottom side, which when fastened to the top of the plate covers the opening in the plate and forms a seal between the cap bottom side and the plate, the cap bottom side comprising:
   an o-ring groove configured to hold an o-ring; and
   a grease channel concentric with the o-ring groove and configured to hold grease to reduce permeation of gas into the enclosure;
   an inlet port that connects the top side of the cap to the grease channel, which enables grease to be injected into the grease channel; and
   an outlet port that connects the top side of the cap to the grease channel, which enables gases to escape the grease channel.

2. The device of claim 1 wherein after the cap is fastened to the top of the enclosure and grease has been injected through the inlet port, the grease channel is completely full of grease.

3. The device of claim 1 wherein the o-ring groove and the grease channel are circular.

4. The device of claim 1 wherein the grease channel is exterior to the o-ring channel.

5. The device of claim 1 wherein the grease channel is interior to the o-ring channel.

6. The device of claim 1 wherein the o-ring is elastomeric.

7. The device of claim 1 wherein the o-ring is steel.

8. The device of claim 1 wherein the grease channel depth is in a range of 10% to 50% of the o-ring groove depth.

9. The device of claim 1 wherein the plate is made of steel.

10. The device of claim 1 wherein the enclosure, plate, and cap, when fastened together, form a vacuum chamber configured to maintain an interior atmospheric pressure that is less than the exterior atmospheric pressure.

11. The device of claim 1 wherein the device is a flywheel device for storing energy that includes a rotor.

* * * * *